(12) United States Patent
Bestgen et al.

(10) Patent No.: US 8,739,279 B2
(45) Date of Patent: May 27, 2014

(54) IMPLEMENTING AUTOMATIC ACCESS CONTROL LIST VALIDATION USING AUTOMATIC CATEGORIZATION OF UNSTRUCTURED TEXT

(75) Inventors: Robert J. Bestgen, Rochester, MN (US); Nicholas T. Lawrence, Rochester, MN (US); Jian Li, Beijing (CN); Dag O. Roppe, Mabel, MN (US); Xing Xing Shen, Beijing (CN); Yi Yuan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 13/007,867

(22) Filed: Jan. 17, 2011

(65) Prior Publication Data

US 2012/0185935 A1      Jul. 19, 2012

(51) Int. Cl.
| | |
|---|---|
| G06F 11/00 | (2006.01) |
| G06F 12/14 | (2006.01) |
| G06F 12/16 | (2006.01) |
| G06F 7/04 | (2006.01) |
| G06F 17/30 | (2006.01) |
| G08B 23/00 | (2006.01) |
| H04N 7/16 | (2011.01) |

(52) U.S. Cl.
USPC .................................. 726/22; 726/25; 726/27

(58) Field of Classification Search
None
See application file for complete search history.

(56) References Cited

U.S. PATENT DOCUMENTS

| | | | | |
|---|---|---|---|---|
| 6,266,664 | B1 * | 7/2001 | Russell-Falla et al. | 707/700 |
| 7,555,482 | B2 | 6/2009 | Korkus | |
| 7,606,801 | B2 * | 10/2009 | Faitelson et al. | 1/1 |
| 8,082,353 | B2 * | 12/2011 | Huber et al. | 709/229 |
| 2003/0061263 | A1 * | 3/2003 | Riddle | 709/104 |
| 2004/0117449 | A1 * | 6/2004 | Newman et al. | 709/206 |
| 2004/0128616 | A1 * | 7/2004 | Kraft | 715/513 |
| 2005/0114678 | A1 * | 5/2005 | Bagga et al. | 713/183 |
| 2006/0129843 | A1 * | 6/2006 | Srinivasa et al. | 713/189 |
| 2010/0023311 | A1 * | 1/2010 | Subrahmanian et al. | 704/2 |
| 2011/0093452 | A1 * | 4/2011 | Jain | 707/723 |
| 2011/0167011 | A1 * | 7/2011 | Paltenghe et al. | 705/320 |

FOREIGN PATENT DOCUMENTS

WO      2005017722 A1      2/2005

* cited by examiner

*Primary Examiner* — Azizul Choudhury
(74) *Attorney, Agent, or Firm* — Joan Pennington

(57) ABSTRACT

A method, system and computer program product are provided for implementing automatic access control list validation using automatic categorization of unstructured text. Automatic categorization of unstructured text is performed on a plurality of documents of an access control list for determining an average term vector. Each of the documents is scored against the average term vector to identify a dissimilar document, flagged as a possible security risk. Automatic categorization of unstructured text is performed on user information of a plurality of members of a candidate access control list for determining a typical term vector. A similarity score is determined by user information and the typical term vector, members of an access control list that are dissimilar from other members of the access control list are identified.

17 Claims, 7 Drawing Sheets

IMPLEMENTING AUTOMATIC ACCESS CONTROL LIST VALIDATION USING AUTOMATIC CATEGORIZATION OF UNSTRUCTURED TEXT

FIELD OF THE INVENTION

The present invention relates generally to the data processing field, and more particularly, relates to a method, system and computer program product for implementing automatic access control list validation using automatic categorization of unstructured text.

DESCRIPTION OF THE RELATED ART

In modern Information Technology (IT) infrastructure environments, it is necessary to secure access to sensitive information. Typically sensitive documents are grouped together and secured by a common access control list.

Access control lists are tedious to maintain and often allow users access to unnecessary information. The members included in an access control list are not usually examined when using it to secure a document. Members of an access control list only rarely have their access revoked, even when they no longer need access to the information. These behaviors create a common problem where unintended users receive access.

Another problem with access control lists is that it is difficult to determine which lists a new user should be included in. Typically this problem is resolved by adding users to the appropriate lists when authority problems are reported. In addition to the possibility of allowing access to unnecessary information, this process is time consuming and frustrating to the end user.

As used in the following description and claims, a "term vector" should be understood to broadly include a sequence of term-weight pairs, and "terms" should be understood to broadly include sequences of non-space characters and text information within predefined fields of user information.

SUMMARY OF THE INVENTION

Principal aspects of the present invention are to provide a method, system and computer program product for implementing automatic access control list validation using automatic categorization of unstructured text. Other important aspects of the present invention are to provide such method, system and computer program product substantially without negative effects and that overcome many of the disadvantages of prior art arrangements.

In brief, a method, system and computer program product are provided for implementing automatic access control list validation using automatic categorization of unstructured text. Automatic categorization of unstructured text is performed on a plurality of documents of an access control list for determining an average term vector. Each of the documents is scored against the average term vector to identify a dissimilar document.

In accordance with features of the invention, the scoring each document against the average term vector includes checking for a low score, and flagging the document as a possible security risk responsive to identifying a low score. The flagged document potentially should not be secured by the access control list of the plurality of documents.

In accordance with features of the invention, user information of each of a plurality of members of a candidate access control list includes associated unstructured text information, typically within predefined fields. The associated unstructured text information includes, for example, office location, department name, and job description. Unstructured text data for all members of an access control list is categorized, a member having information that is dissimilar to the other members advantageously is identified and an administrator can be alerted to such identified member.

In accordance with features of the invention, automatic categorization of unstructured text is performed on user information of a plurality of members of a candidate access control list for determining a typical term vector. A similarity score is determined by user information and the typical term vector.

In accordance with features of the invention, the user is recommended to become a member of the candidate access control list responsive to identifying a high score. Performing automated categorization on text data associated with a user identification, potential membership of access control lists for the user advantageously are identified and an administrator can be notified.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, a system, and a computer program product are provided for implementing automatic access control list validation using automatic categorization of unstructured text.

Figure 1:
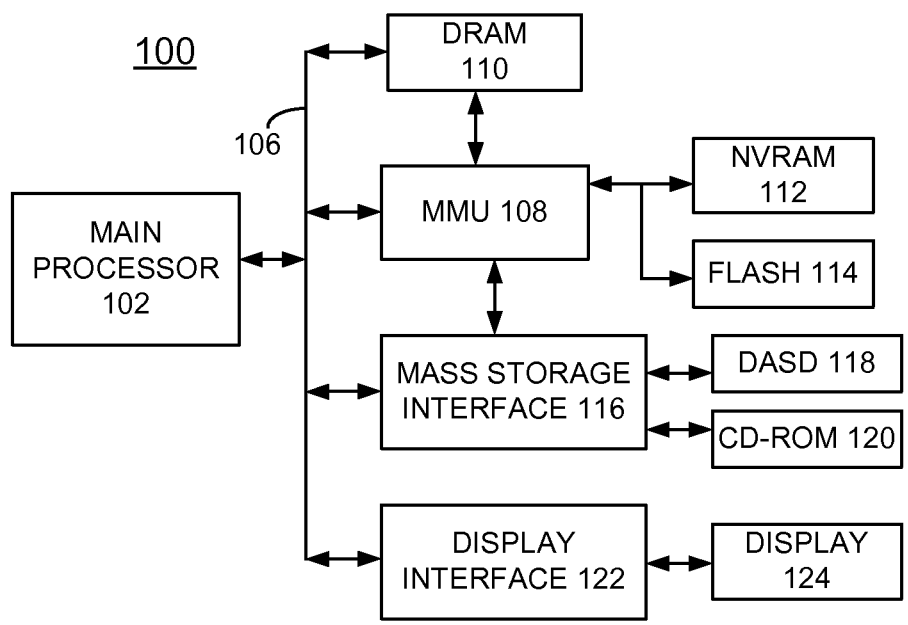
FIGS. 1 and 2 are block diagram representations illustrating an example computer system and operating system for implementing enhanced automatic access control list validation using automatic categorization of unstructured text in accordance with a preferred embodiment.
Figure 2:
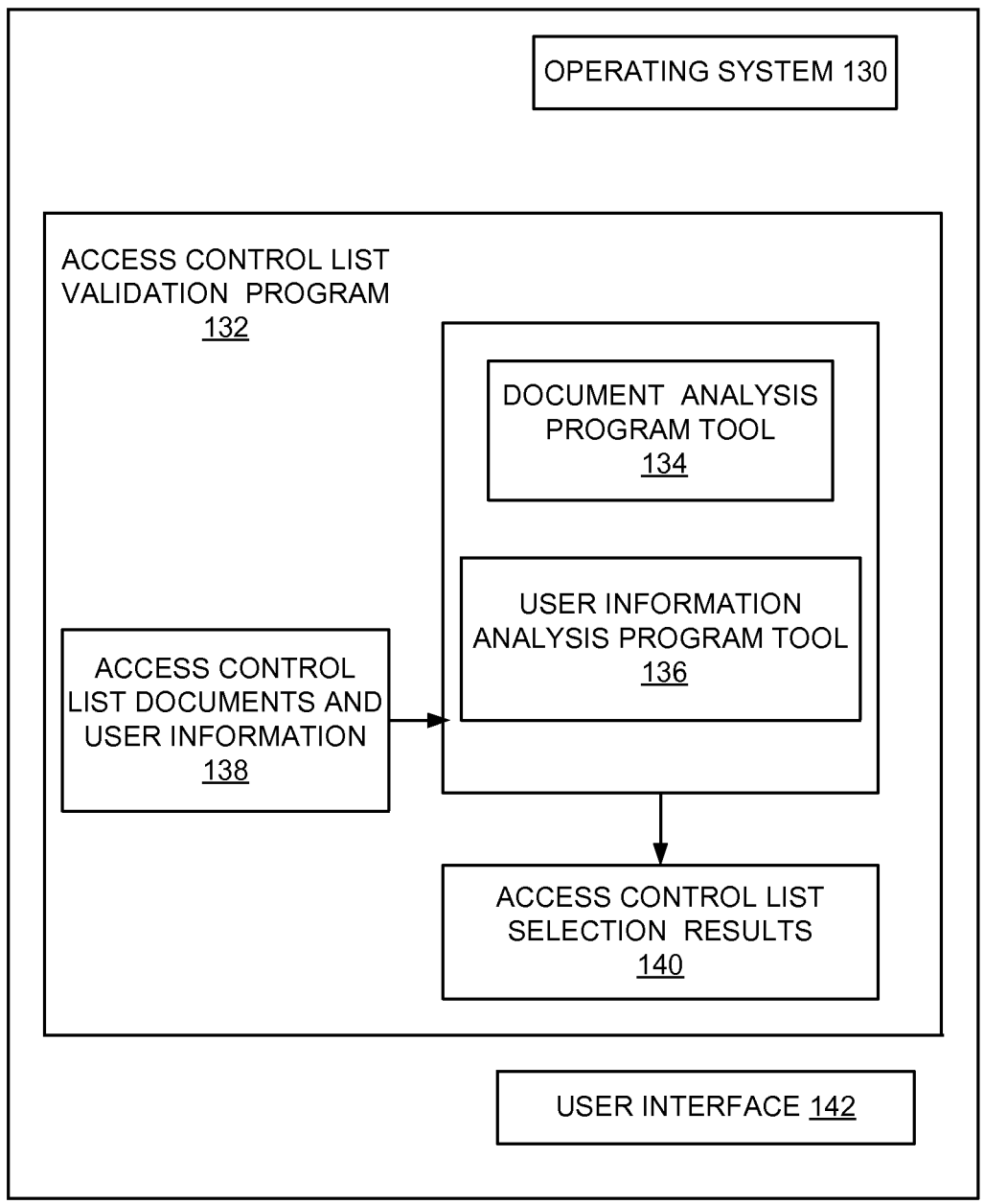

Referring now to the drawings, in FIGS. 1 and 2 there is shown a computer system generally designated by the reference character 100 for implementing enhanced access control list validation using automatic categorization of unstructured text in accordance with a preferred embodiment. Computer system 100 includes a main processor 102 or central processor unit (CPU) 102 coupled by a system bus 106 to a memory management unit (MMU) 108 and system memory including a dynamic random access memory (DRAM) 110, a nonvolatile random access memory (NVRAM) 112, and a flash memory 114. A mass storage interface 116 coupled to the system bus 106 and MMU 108 connects a direct access storage device (DASD) 118 and a CD-ROM drive 120 to the main processor 102. Computer system 100 includes a display interface 122 coupled to the system bus 106 and connected to a display 124.

Computer system 100 is shown in simplified form sufficient for understanding the present invention. The illustrated computer system 100 is not intended to imply architectural or functional limitations. The present invention can be used with various hardware implementations and systems and various other internal hardware devices, for example, multiple main processors.

As shown in FIG. 2, computer system 100 includes an operating system 130, an access control list validation program 132, a document analysis program tool 134 and a user information analysis program tool 136 of the preferred embodiment, an access control list documents and user information input 138, providing access control list selection results 140, and a user interface 142.

Various commercially available computers can be used for computer system 100. CPU 102 is suitably programmed by the access control list validation program 132, the document analysis program tool 134 and the user information analysis program tool 136 to execute the operations and flowcharts of FIGS. 3, 4, 5 and 6 for implementing enhanced automatic access control list validation using automatic categorization of unstructured text in accordance with the preferred embodiment.

Figure 3:
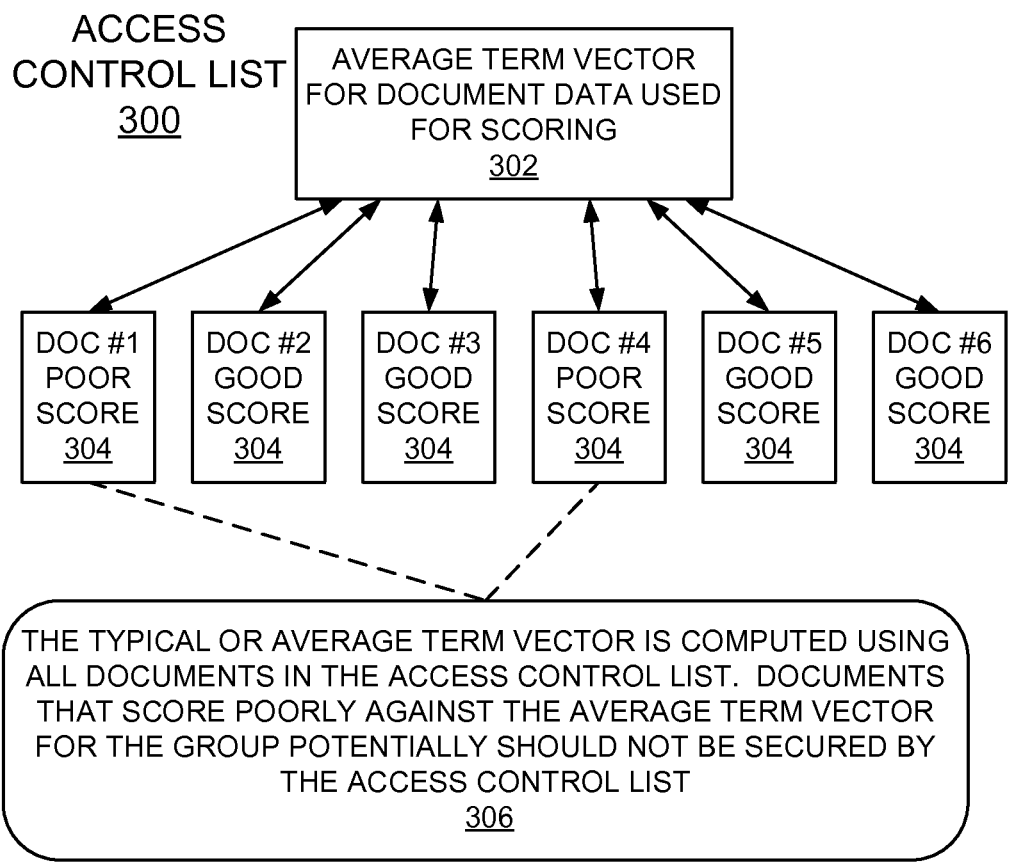
FIGS. 3, 4, 5, and 6 are flow charts illustrating exemplary operations for implementing enhanced automatic access control list validation using automatic categorization of unstructured text in accordance with preferred embodiments.

Referring to FIG. 3, there are shown exemplary operations for an access control list generally designated by the reference character 300 for implementing enhanced automatic access control list validation using automatic categorization of unstructured text in accordance with a preferred embodiment. An average term vector for average document data indicated at block 302 is determined by automatic categorization of unstructured text being performed a plurality of documents 304, #1-6 of the access control list 300. Each of the documents 304, #1-6 is scored against the average term vector to identify a dissimilar document, with an indicated poor score indicating dissimilar documents #1, and #4, as shown. As indicated at a block 306, the typical or average term vector 302 is computed using all documents in the access control list, and documents that score poorly against the average term vector for the document group potentially should not be secured by the access control list 300.

Figure 4:
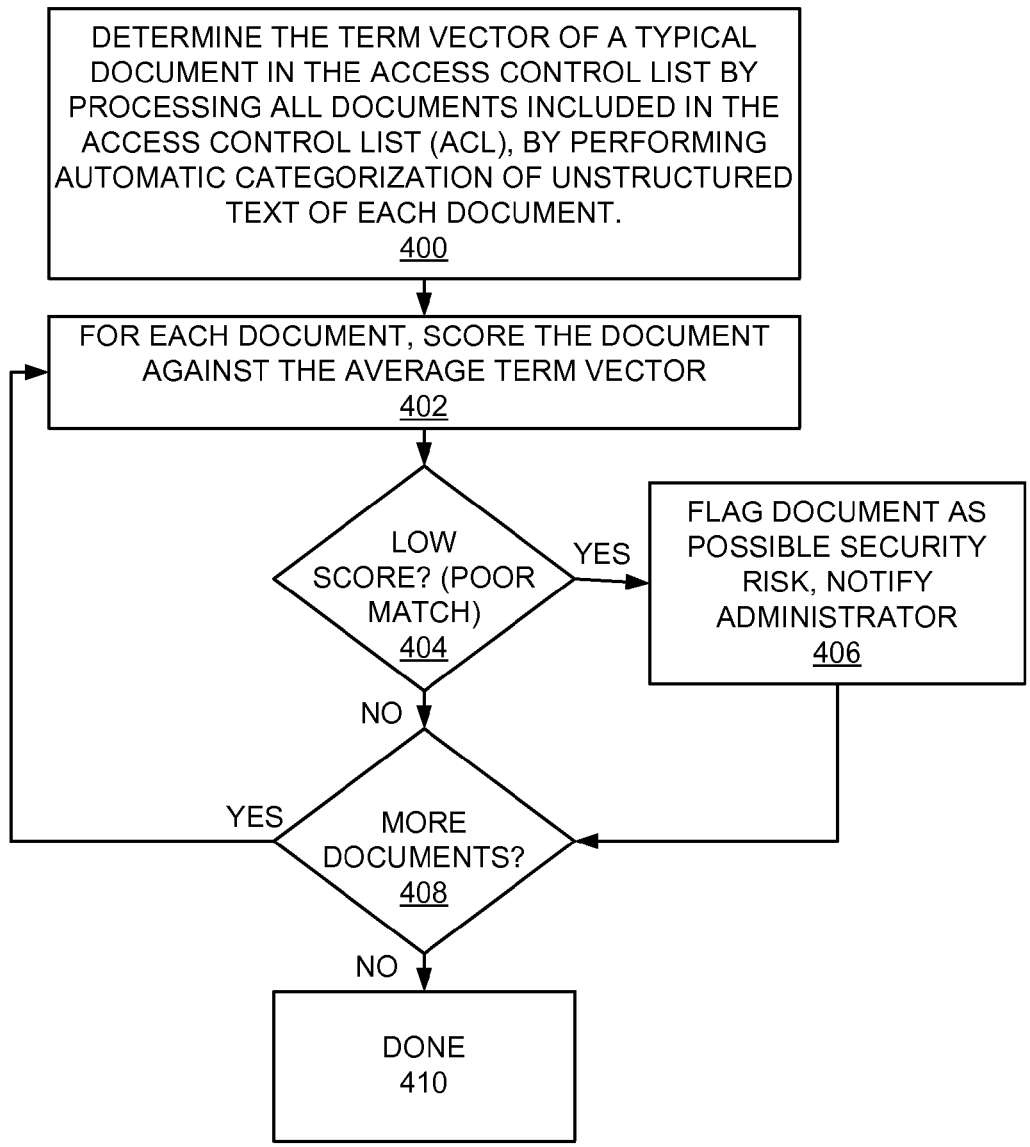

Referring to FIG. 4, there are shown exemplary steps for implementing enhanced automatic access control list validation using automatic categorization of unstructured text in accordance with a preferred embodiment. As indicated at a block 400, the average term vector is determined by processing all documents of the access control list performing automatic categorization of unstructured text of each document. Then for each document, the document is scored against the average term vector as indicated at a block 402. The scoring each document against the average term vector includes checking for a low score or poor match as indicated at a decision block 404, and flagging the document as a possible security risk, and notifying an administrator responsive to identifying a low score as indicated at a block 406. The flagged document potentially should not be secured by the access control list of the plurality of documents. Checking for more documents is performed as indicated at a decision block 408. When another document is identified, then the document is scored returning to block 402. When another document is not identified, then the processing is done as indicated at a block 410.

Figure 5:
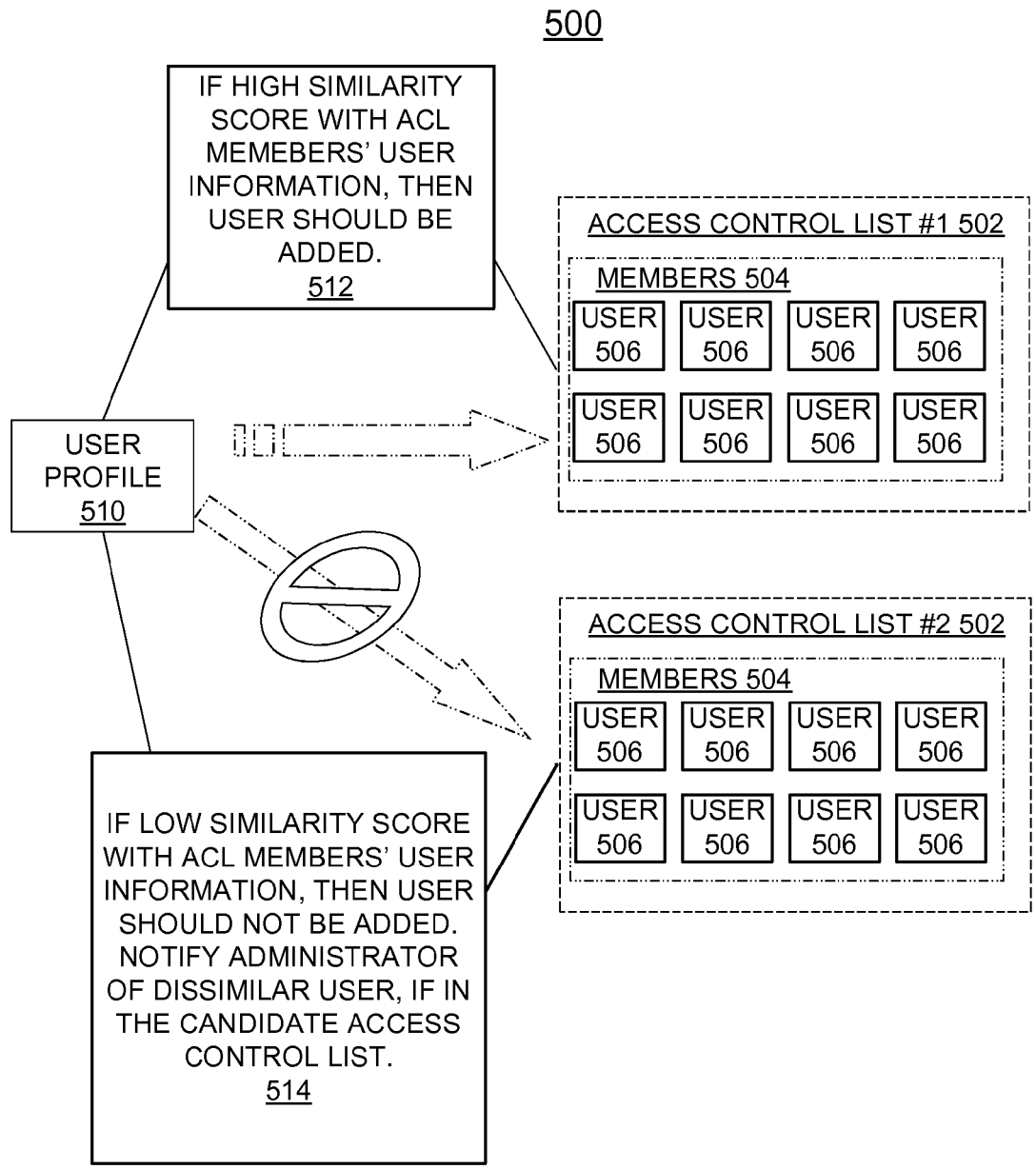

Referring to FIG. 5, there are shown exemplary operations generally designated by the reference character 500 for implementing enhanced automatic access control list validation using automatic categorization of unstructured text in user information in accordance with a preferred embodiment. Each of a first access control list 502, #1, and a second access control list 502, #2 include a plurality of members 504, each including user information 506. A user profile as indicated at a block 510 is received and processed, for example, as illustrated and described with respect to FIG. 6. As indicated at a block 512, if a high similarity score is determined using the user information 506 for the members 504 of ACL 502 and the user profile information, then the user profile 510 should be added to the access control list. As indicated at a block 514, if a low similarity score is determined using the user information 506 for the members 504 of ACL 502 and the user profile information, then the user should not be added to the access control list, and if the user is a current member of the access control list the administrator should be notified of the dissimilar user.

Figure 6:
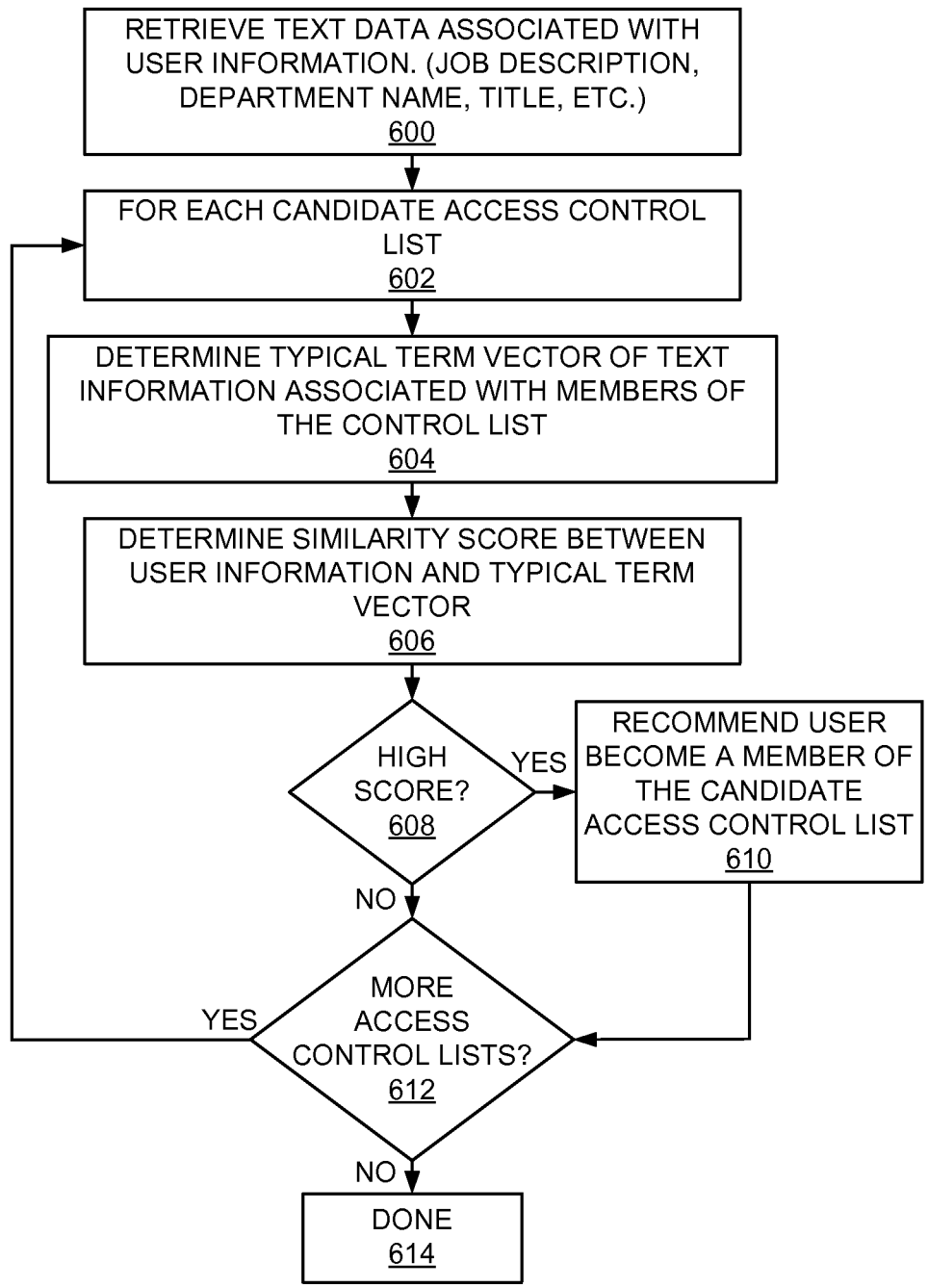

Referring to FIG. 6, there are shown exemplary steps for implementing enhanced automatic access control list validation using automatic categorization of unstructured text in user information in accordance with a preferred embodiment. As indicated at a block 600, text data associated with user information is retrieved, such as job description, department name, title, and the like. For each candidate access control list as indicated at a block 602, a typical term vector is determined of text information associated with members of the access control list as indicated at a block 604. As indicated at a block 606, a similarity score is determined between the user information and the typical term vector. Checking for a high score is performed as indicated at a decision block 608. When a high score is identified, the user is recommended to become a member of the candidate access control list as indicated at a block 610. Checking for more access control lists is performed as indicated at a decision block 612. When another control list is identified, then the operations continue, returning to block 602. When another control list is not identified, then the processing is done as indicated at a block 614.

Figure 7:
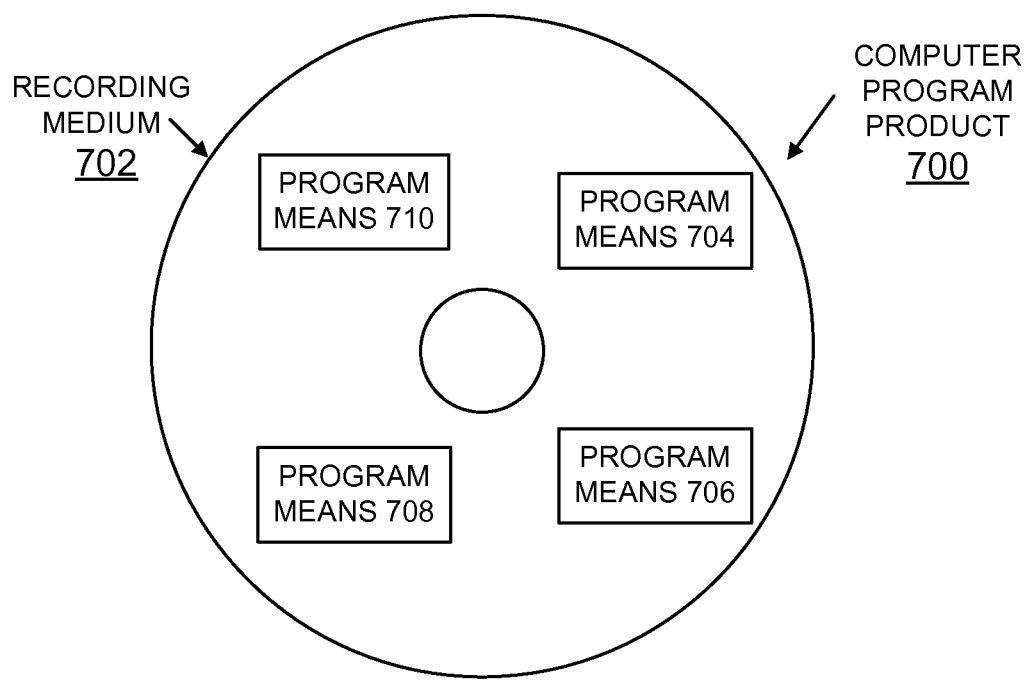
FIG. 7 is a block diagram illustrating a computer program product in accordance with a preferred embodiment.

Referring now to FIG. 7, an article of manufacture or a computer program product 700 of the invention is illustrated. The computer program product 700 includes a recording medium 702, such as, a floppy disk, a high capacity read only memory in the form of an optically read compact disk or CD-ROM, a tape, or another similar computer program product. Recording medium 702 stores program means 704, 706, 708, 710 on the medium 702 for carrying out the methods for implementing access control list validation of the preferred embodiment in the system 100 of FIGS. 1 and 2.

A sequence of program instructions or a logical assembly of one or more interrelated modules defined by the recorded program means 704, 706, 708, 710, direct the computer system 100 for implementing access control list validation of the preferred embodiment.

While the present invention has been described with reference to the details of the embodiments of the invention shown in the drawing, these details are not intended to limit the scope of the invention as claimed in the appended claims.

What is claimed is:

1. A computer-implemented method for implementing access control list validation comprising:

using a computer, processing unstructured text of a plurality of documents of an access control list for determining an average term vector;

scoring each of the plurality of documents against the average term vector to identify a dissimilar document responsive to identifying a low score indicating a poor match;

flagging the identified dissimilar document as a possible security risk and notifying an administrator of the flagged document;

processing text data associated with a plurality of members of said access control list for determining a typical term vector;

processing text data associated with a user profile information and determining a similarity score between said user profile information and the typical term vector; and identifying said user profile to be added to said access control list responsive to a high similarity score and notifying the administrator of said user profile.

2. The computer-implemented method as recited in claim 1 wherein processing unstructured text on a plurality of documents of an access control list includes performing automatic categorization of unstructured text of the plurality of documents of the access control list.

3. The computer-implemented method as recited in claim 1 wherein processing text data associated with a plurality of members of said access control list includes processing unstructured text of user information of said plurality of members of said access control list and determining the typical term vector.

4. The computer-implemented method as recited in claim 3 includes performing automatic categorization of unstructured text of user information of the plurality of members and identifying dissimilar member user information from the typical term vector.

5. The computer-implemented method as recited in claim 3 includes determining said similarity score between the unstructured text of said user information and the typical term vector.

6. The computer-implemented method as recited in claim 5 includes recommending a user not be added to said access control list responsive to identifying a low similarity score.

7. A computer program product for implementing access control list validation in a computer system, said computer program product tangibly embodied on a non-transitory computer readable storage medium, said computer program product including instructions stored on said non-transitory computer readable storage medium, said processor executing said instructions to cause the computer system to perform the steps of:

processing unstructured text of a plurality of documents of an access control list for determining an average term vector;

scoring each of the plurality of documents against the average term vector to identify a dissimilar document responsive to identifying a low score indicating a poor match;

flagging the identified dissimilar document as a possible security risk and notifying an administrator of the flagged document;

processing text data associated with a plurality of members of said access control list for determining a typical term vector;

processing text data associated with a user profile information and determining a similarity score between said user profile information and the typical term vector; and identifying said user profile to be added to said access control list responsive to a high similarity score and notifying the administrator of said user profile.

8. The computer program product as recited in claim 7 wherein processing unstructured text of a plurality of documents of an access control list includes performing automatic categorization of unstructured text of the plurality of documents of the access control list.

9. The computer program product as recited in claim 7 includes checking for a low similarity score, and recommending a user not be added to said access control list responsive to identifying a low similarity score.

10. The computer program product as recited in claim 7 wherein processing text data associated with a plurality of members of said access control list includes processing unstructured text of user information of said plurality of members of said access control list and determining the typical term vector.

11. The computer program product as recited in claim 10 includes determining said similarity score between the unstructured text of said user information and the typical term vector.

12. The computer program product as recited in claim 11 includes recommending a user to become a member of said access control list responsive to identifying a high similarity score.

13. A system for implementing access control list validation comprising:

a processor, access control list validation computer program product tangibly embodied on a non-transitory computer readable storage medium, said access control list validation computer program product including a document analysis program and a user information analysis program;

said processor using said access control list validation computer program product including said document analysis program and said user information analysis program to perform the steps of:

processing unstructured text of a plurality of documents of an access control list for determining an average term vector;

scoring each of the plurality of documents against the average term vector to identify a dissimilar document responsive to identifying a low score indicating a poor match;

flagging the identified dissimilar document as a possible security risk and notifying an administrator of the flagged document;

processing text data associated with a plurality of members of said access control list for determining a typical term vector;

processing text data associated with a user profile information and determining a similarity score between said user profile information and the typical term vector; and identifying said user profile to be added to said access control list responsive to a high similarity score and notifying the administrator of said user profile.

14. The system as recited in claim 13 wherein said processor processing unstructured text of a plurality of documents of an access control list includes said processor performing automatic categorization of unstructured text of the plurality of documents of the access control list.

15. The system as recited in claim 13 wherein processing text data associated with a plurality of members of said access control list includes said processor processing unstructured text of user information of said plurality of members of said access control list and determining the typical term vector and determining said similarity score between user information and the typical term vector.

16. The system as recited in claim 13 includes said processor determining said high similarity score between user information and the typical term vector, and recommending a user to become a member of said access control list responsive to the high similarity score.

17. The system as recited in claim 13 includes said processor determining a low similarity score between user information and the typical term vector, and notifying an administrator of a dissimilar user of said access control list responsive to the low similarity score.

* * * * *